US006260866B1

(12) United States Patent
Cheng

(10) Patent No.: US 6,260,866 B1
(45) Date of Patent: Jul. 17, 2001

(54) SKATE-SCOOTER

(76) Inventor: Tzu-Hung Cheng, No. 4, Ding An Street, Lane 25, Tainan City (TW)

( * ) Notice: Subject to any disclaimer, the term of this patent is extended or adjusted under 35 U.S.C. 154(b) by 0 days.

(21) Appl. No.: 09/611,819

(22) Filed: Jul. 7, 2000

(51) Int. Cl.[7] ...................................................... B62M 1/00
(52) U.S. Cl. ................................... 280/87.05; 280/87.041
(58) Field of Search ............................ 280/87.05, 87.041, 280/87.021, 47.371, 655, 655.1; 403/150, 154, 157, 161, 84, 100, 101, 99

(56) References Cited

U.S. PATENT DOCUMENTS 1,568,412 * 1/1926 Parkes ............................ 280/87.041
4,707,884 * 11/1987 Chang .................................. 16/440
5,927,733 * 7/1999 Banda ............................ 280/87.041
6,120,044 * 9/2000 Tsai .................................. 280/87.05
6,158,751 * 12/2000 Wu et al. ....................... 280/87.041
6,173,976 * 1/2001 Lee .................................. 280/87.05
6,179,307 * 1/2001 Mao ............................... 280/87.041
6,182,988 * 2/2001 Wu .................................. 280/87.05
6,193,248 * 2/2001 Liu ................................ 280/87.041

* cited by examiner

*Primary Examiner*—J. J. Swann
*Assistant Examiner*—James S. McClellan
(74) *Attorney, Agent, or Firm*—Alan Kamrath Rider, Bennett, Egan & Arundel , LLP

(57) ABSTRACT

A skate-scooter includes a footplate, a U-shaped collapse base fixed on an upper surface of a front end portion of the footplate, a hollow connector having an open lower end for a coil spring to fit in the hollow connector, a cylinder for a lower end of a handle support tube to fit and positioned therein and having two inclined parallel walls defining a space for the connector to fit therein, a front wheel combined with the cylinder, and a rear wheel combined with a rear end of the footplate. The hollow connector and the two inclined parallel walls of the cylinder are pivotally connected to the collapse base to let the connector, the cylinder and the handle support tube extend or collapse by means of a pin bolt with a push member to push up the connector, the two inclined walls of the cylinder and the handle support tube to separate from a first inclined slot and moved to a second inclined slot of the collapse base from the extended position to the collapsed position.

3 Claims, 6 Drawing Sheets

SKATE-SCOOTER

BACKGROUND OF THE INVENTION

This invention relate to a skate-scooter including a footplate, a U-shaped collapse base fixed on a front end portion of the footplate, a hollow connector containing a coil spring, a cylinder for a lower end of a handle support tube to connect with each other and having two inclined walls for the hollow connector to fit between. The connector and the two inclined walls of the cylinder are pivotally connected to the collapsed base having a first inclined slot and a second inclined slot for a pin bolt supporting the coil spring in the connector to fit in and separate from to move from the first to the second inclined slot by manually moving a pin bolt with a push member so as to extend or collapse the skate-scooter.

Common conventional skate-scooters generally includes a foot plate, a pivotal connect member connected with a front end of the foot plate, a handle support tube pivotally connected with the pivotal member and adjustable in its length, a handle fixed on an upper end of the handle support tube, a rear wheel and a front wheel combined with a rear end and a front end of the foot plate. Then the handle with the handle support tube may be collapsed on the footplate when the skate-scooter is not used. The pivotal connect member is located between the foot plate and the handle support tube, having a U-shaped base with a hole each in two vertical walls and an inclined rod having a lower end pivotally connected to the U-shaped base by means of a pin bolt screwed with a tightening means to tighten the inclined rod with the U-shaped base in any angle by loosening and tightened by the tightening means so that the handle support tube together with the inclined rod of the pivotal connect member may be extended for use or collapsed for storing sway.

SUMMARY OF THE INVENTION

This invention has been devised to offer a skate-scooter collapsible by means of a collapse base fixed on a footplate pivotally connected to a hollow connector fitting in a space between two parallel walls of the collapse base and a cylinder connected to a handle support tube. The hollow connector and two inclined walls extending inclinedly from the cylinder are pivotally connected to the collapse base so that the handle support tube together with the cylinder and the connector may be extended or collapsed by a pin bolt passing through holes in the two parallel walls of the connector, the two inclined walls of the cylinder and the two parallel walls of the collapse walls. Then the handle support tube together with the cylinder may be extended for use or collapsed for storing away.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
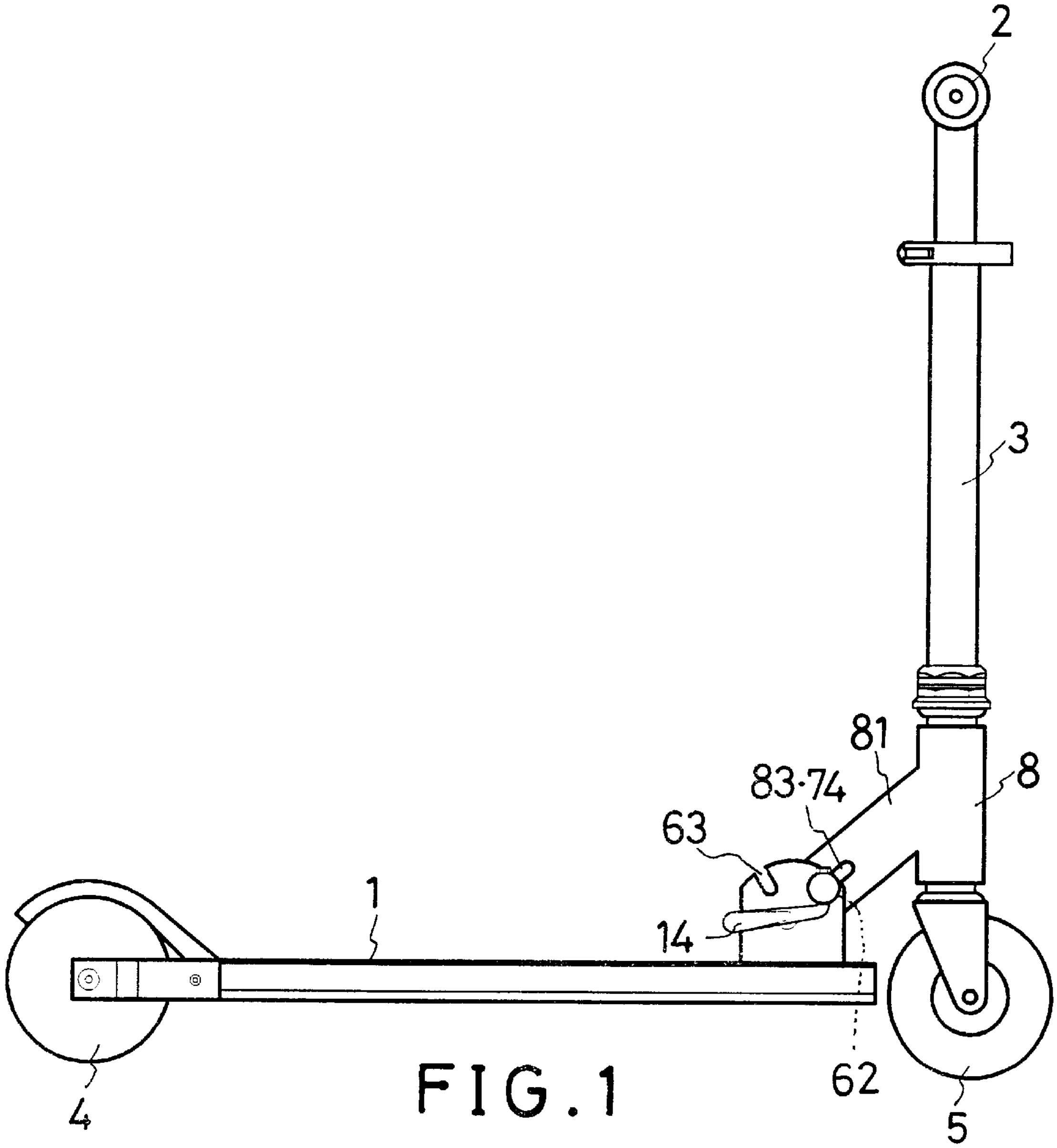
FIG. 1 is a side view of a skate-scooter in the present invention.

A preferred embodiment of a skate-scooter in the present invention, as shown in FIG. 1, includes a foot plate 1, a handle 2, a handle support tube 3 vertically and pivotally connected to the handle on its upper end and adjustable in its length, a front wheel 5 combined with a lower end of the handle support tube 3 in front of the foot plate 1 and a rear wheel 4 combined with a rear end of the foot plate 1.

Figure 2:
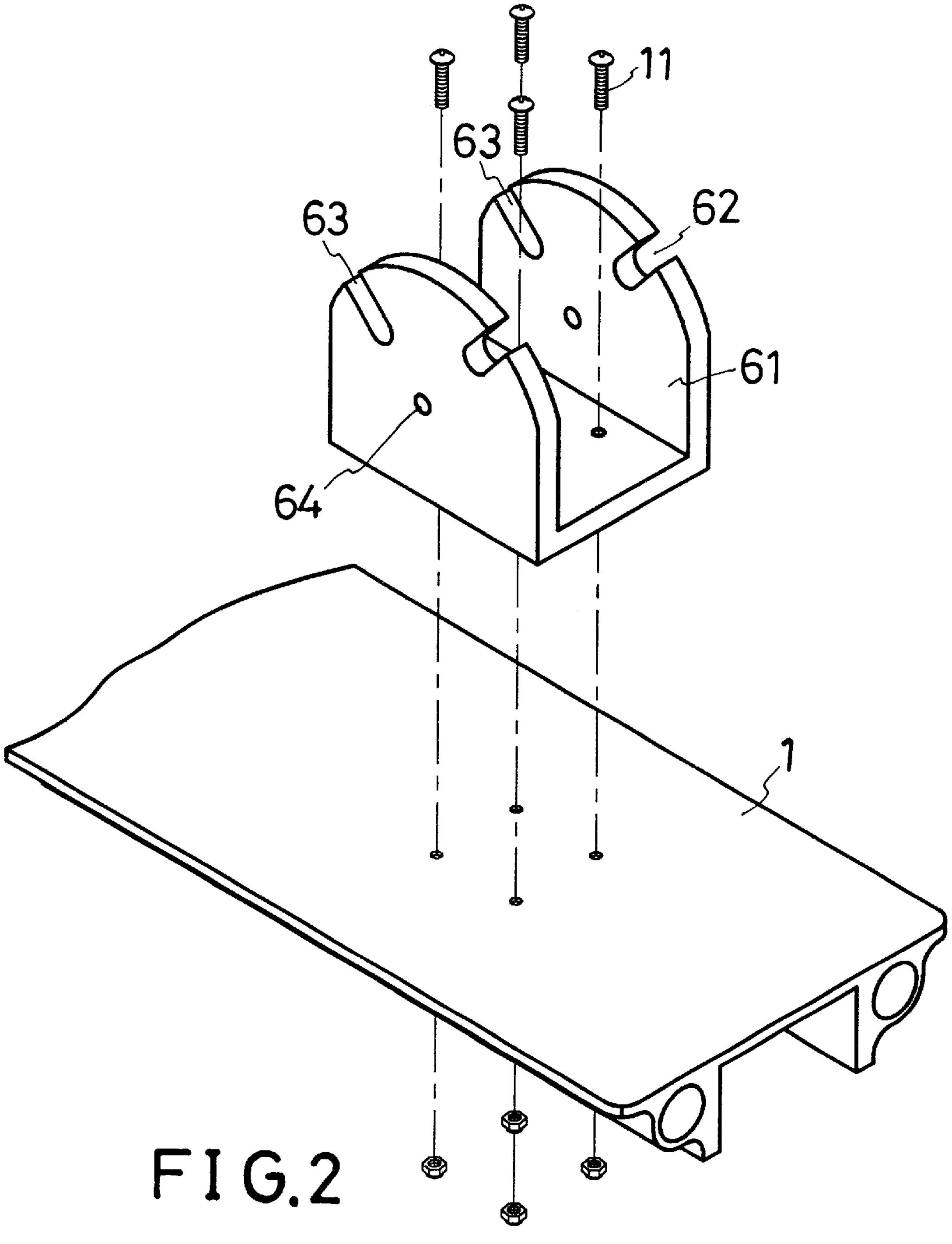
FIG. 2 is an exploded perspective view of a footplate and a collapsing base in the present invention.

A U-shaped collapse base 6 is fixed on an upper surface of a front portion of the footplate with plural bolts 11, as shown in FIG. 2, having two parallel vertical walls 61, which respectively have a first inclined slot 62 with an upper opening and a second inclined slot 63 with an upper opening.

Figure 3:
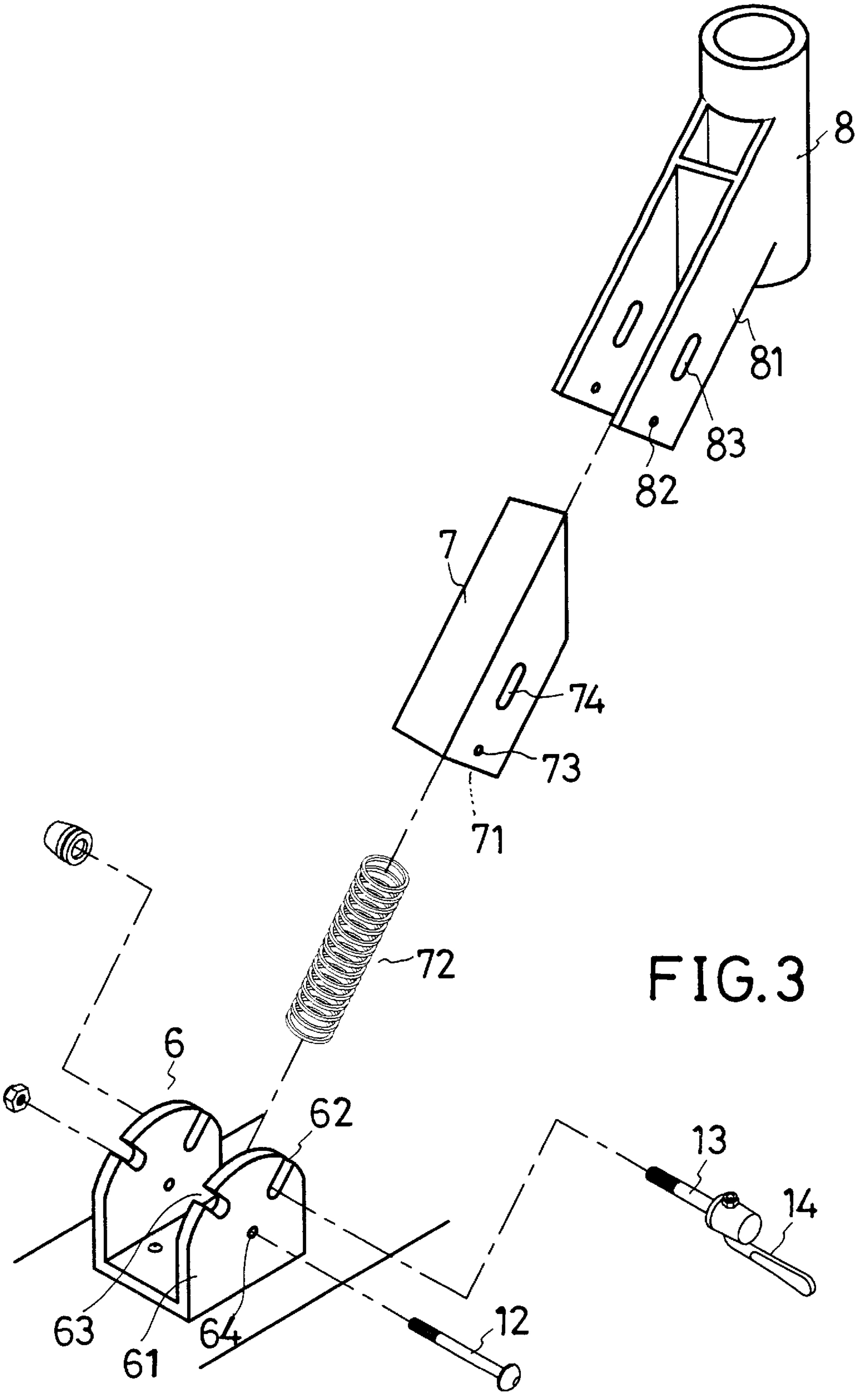
FIG. 3 is an exploded perspective view of the collapsing base, a connector and a receiving cylinder in the present invention.

A hollow connector 7 of a certain length is fitted in the space between the two parallel vertical walls 61 of the U-shaped collapse base 6 as shown in FIG. 3, having a lower opening end 71 for a coil spring 72 to extend therein.

Further, a movable cylinder 8 has two side sloped parallel walls 81 extending from an outer surface of the receiving cylinder 8 in a sloped condition. The lower end of the handle support tube 3 fits in the movable cylinder 8, and the hollow connector 7 fits in a space between the two side parallel-sloped walls 81. The two side parallel sloped walls 81 respectively have a hole 82 and a slot 83 and the hollow connector 7 also has a hole 73 and a slot 74 in two side walls in corresponding locations. Then the collapse base 6 has a hole 64 respectively in the two parallel walls 61 for a first pin bolt 12 to pass through and also through the holes 82 and 73 to pivotally connect the connector 7 and the movable cylinder 8 together. Further, a second pin bolt 13 orderly passes through the slots 83 and 74 of the cylinder 8 and the connector 7 so as to stop a lower end of the coil spring 72 as shown in FIGS. 4–9, with the two ends of the pin bolt 13 rest either in the first or the second inclined slot 62 or 63 of the two parallel walls 61.

Figure 6:
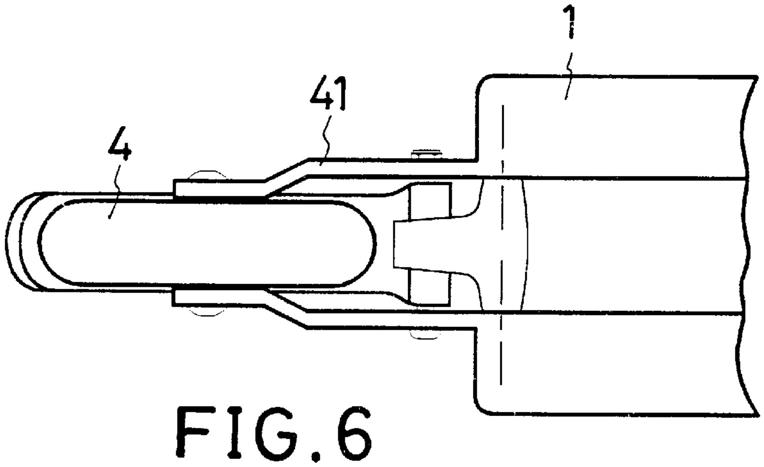
FIG. 6 is a bottom view of the footplate and a rear wheel combined together in the present invention: and, FIG. 7 is a side view of the skate-scooter in the collapsed position in the present invention.

Next, the processing steps of the footplate 1 are shown in FIGS. 5–9, 10 and 11, and it should be noted that the foot plate 1 is made of aluminum alloy by means of pressing process as shown in FIGS. 5–9, having a preset width, and then two vertical parallel walls are formed by pressing and cutting processes in one end as shown in FIGS. 5–10, and then pressed to alter the two vertical parallel walls into two connect rods 41 for supporting a rear wheel 5 as shown in FIGS. 5–11, so as to assemble the rear wheel 5 between them as shown in FIG. 6.

Next, the second pin bolt 13 passing through the slots 83 and 74 of the cylinder 8 and the connector 7 has a press member 14 fixed to extend outward for manually pushing up the pin bolt 13 as shown in FIGS. 3 and 1 to collapse the cylinder 8 and the handle support tube 3 from the extended condition.

In collapsing the skate-scooter form the extended condition to the collapsed condition, as shown in FIGS. 4–9, 10, 11, manually push up the second pin bolt 13 to separate from the first slot 62 as shown in FIGS. 4–10 and then move the connector 7 and the cylinder 8 with the pin bolt 13 move along an upper edge of the two parallel walls 61 to the second slot 63, and then the second pin bolt 13 may be pushed in the second slot 63 elastically by the compressed coil spring 72. as shown in FIGS. 4–11, which is the collapsed condition. Thus, the handle support tube 3 may extend in the extended condition shown in FIG. 1 and collapse in the collapsed condition shown in FIG. 7 very smoothly even for a long time of use.

Figure 4:
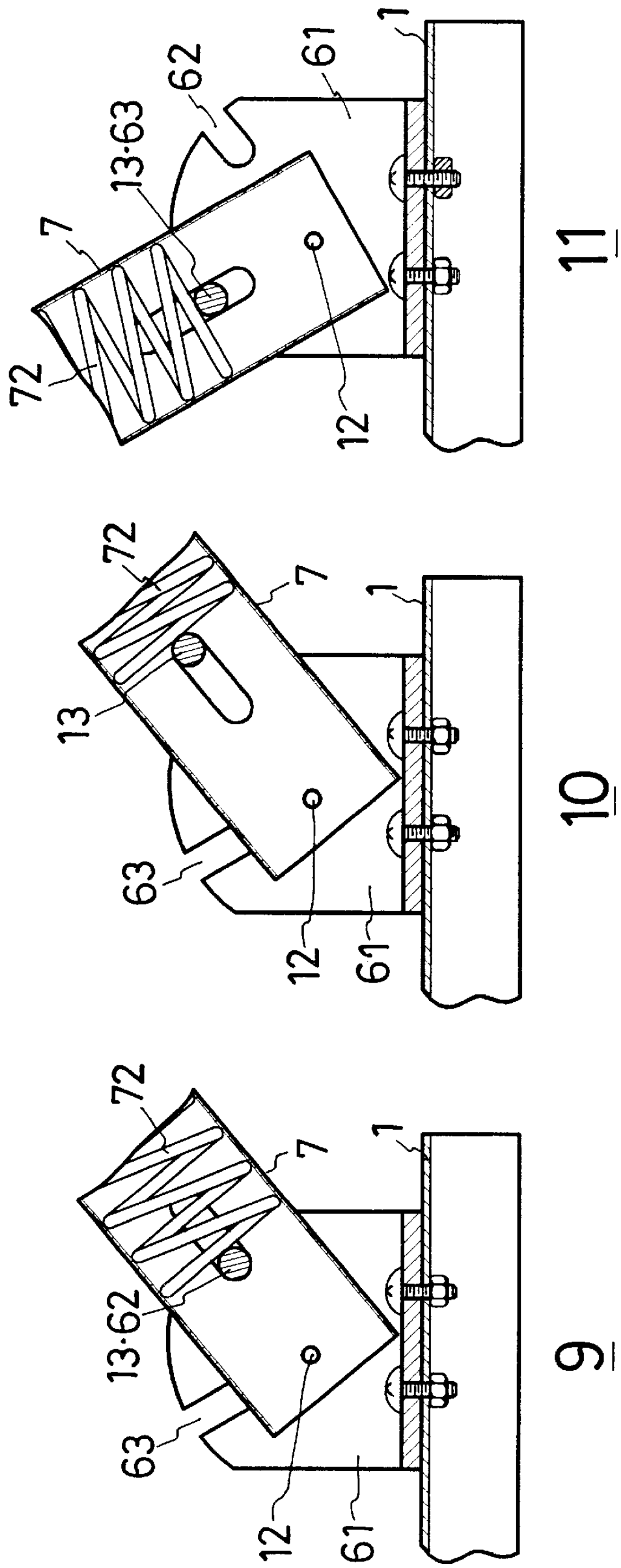
FIG. 4 is a side view of three kinds of conditions of the collapsing base and the connector in the present invention.
Figure 5:
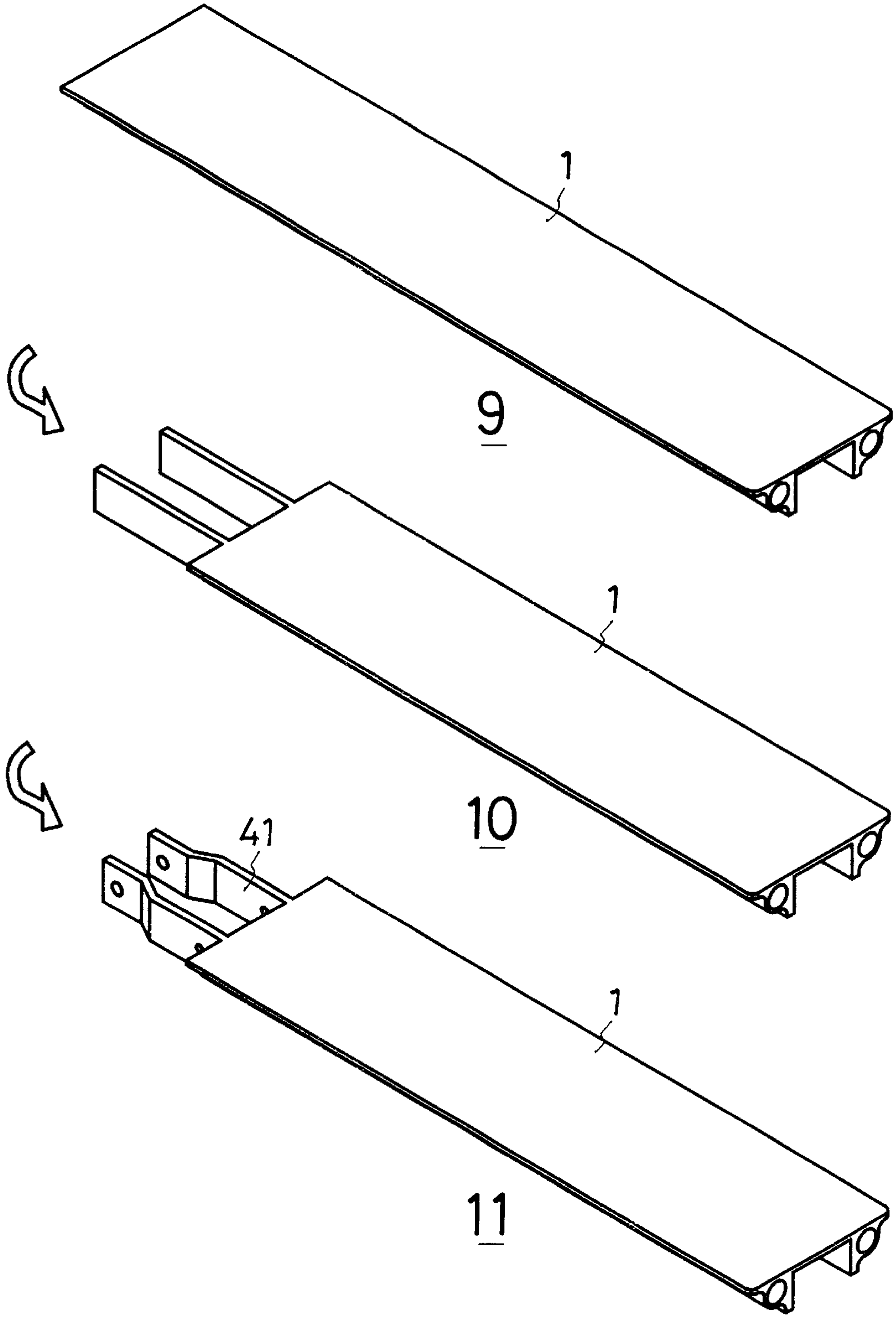
FIG. 5 is a perspective view of the foot plate under three kinds of processing in the present invention.
Figure 7:
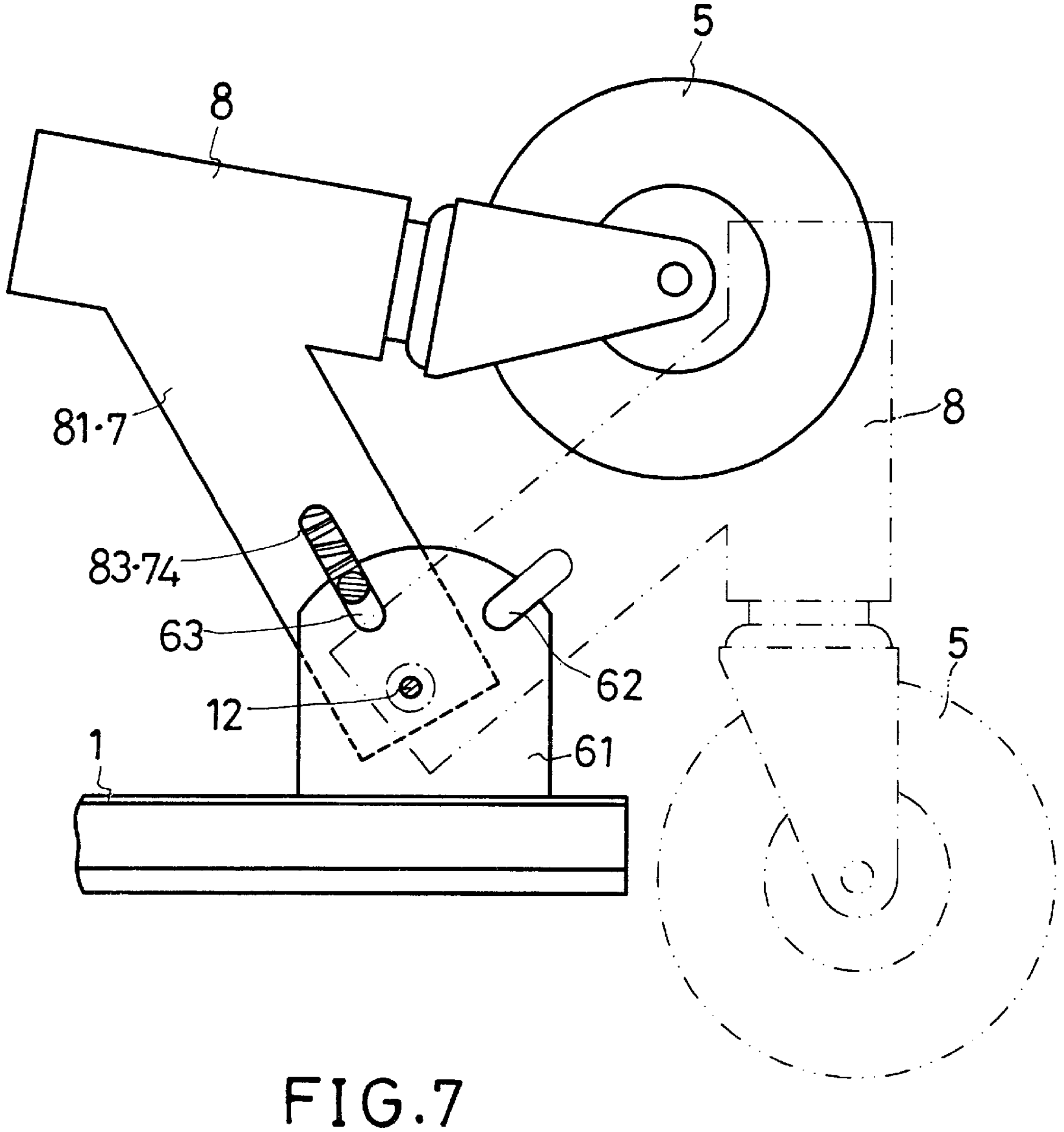

In extending, the handling processes are the same as shown in FIG. 4, and the second pin bolt 13 is separated from the second inclined slot 63 and moved to fit in the first inclined slot 62 to permit the handle support tube stand vertical in the extended position for use.

While the preferred embodiment of the invention has been described above, it will be recognized and understood that various modifications may be made therein and the appended claims are intended to cover all such modifications that may fall within the spirit and scope of the invention.

What is claimed is:

1. A skate-scooter comprising a footplate, a handle support tube having an upper end fixed with a handle and a lower end connected with a cylinder, a front wheel combined with said cylinder, and a rear wheel combined with a rear end of said footplate:

characterized by an U-shaped collapse base having two vertical parallel walls, each of said two vertical parallel walls having a first inclined slot with an upper opening and a second inclined slot with an upper opening spaced apart with a preset angle, a hollow connector movably fitted in a space defined by said two vertical parallel walls with an open lower end, a coil spring fitted in said hollow connector from said open lower end, said cylinder having two inclined parallel walls extending inclinedly downward, said two inclined parallel walls defining a space for said connector to fit therein, said U-shaped collapse base having a hole bored in each of said two parallel walls, said hollow connector having a hole in a lower end of each of said two vertical parallel walls, each of said two inclined parallel walls of said cylinder having a hole, a first pin bolt passing through said holes of said collapse base, said connector and said two inclined walls of said cylinder to pivotally connecting said connecter and said cylinder together with said collapse base, said hollow connector further having a slot in each of said two vertical parallel walls, each of said two inclined parallel walls of said cylinder having a slot, a second pin bolt passing through said slots of said connector and said two inclined parallel walls and supporting a lower end of said coil spring in said connector, said second pin bolt having two ends fitting either in said first inclined slot or said inclined second slot of said collapse base:

said second pin bolt fitting in said first slots of said collapse base to permit said handle support tube to swing in an upright extended condition for using said skate-scooter, said second pin bolt manually pushed up to raise said coil spring, said connector and said cylinder are separated out of said first inclined slots of said collapse base and moved rearward along curved upper edges of said two parallel walls of said collapse base to said second inclined slots, then said second pin bolt is elastically pushed by said raised coil spring to fall in said second inclined slots to permit said handle support tube with said cylinder and said front wheel to swing into a collapsed position.

2. The skate-scooter as claimed in claim 1, wherein said footplate is made of aluminum alloy plate by means of a pressing process and formed into two vertical plates spaced apart parallel in a rear end by means of a pressing and cutting process for supporting a rear wheel.

3. The skate-scooter as claimed in claim 1, wherein said second pin bolt passing through said slots of said connector and said two inclined walls of said cylinder has a push member fixed to extend out of said second pin bolt so as to push up said pin bolt to collapse said handle support tube together with said cylinder from the extended position, or vice versa.

* * * * *